US010262820B2

(12) United States Patent
Phillpotts et al.

(10) Patent No.: US 10,262,820 B2
(45) Date of Patent: Apr. 16, 2019

(54) HIGH VOLTAGE CIRCUIT BREAKER, SYSTEM, VACUUM INTERRUPTER MODULE AND ASSOCIATED DRIVE MODULE

(71) Applicant: Tyco Electronics UK Ltd, Swindon (GB)

(72) Inventors: Robert Phillpotts, Swindon (GB); Elizabeth Da Silva Domingues, Chippenham (GB); Thomas Moore, Marlborough (GB)

(73) Assignee: Tyco Electronics UK Ltd, Swindon (GB)

( * ) Notice: Subject to any disclaimer, the term of this patent is extended or adjusted under 35 U.S.C. 154(b) by 0 days.

(21) Appl. No.: 15/603,845

(22) Filed: May 24, 2017

(65) Prior Publication Data
US 2017/0256374 A1    Sep. 7, 2017

Related U.S. Application Data

(63) Continuation of application No. PCT/EP2015/077489, filed on Nov. 24, 2015.

(30) Foreign Application Priority Data

Nov. 27, 2014  (EP) .................................. 14195293

(51) Int. Cl.
*H01H 33/666*  (2006.01)
*H01H 33/662*  (2006.01)
(Continued)

(52) U.S. Cl.
CPC ............ *H01H 33/666* (2013.01); *B60L 5/18* (2013.01); *H01H 9/54* (2013.01); *H01H 33/662* (2013.01);
(Continued)

(58) Field of Classification Search
CPC .... H01H 33/666; H01H 33/662; H01H 89/00; H01H 33/027; H01H 33/668; B60L 5/18; B60L 2200/26
(Continued)

(56) References Cited

U.S. PATENT DOCUMENTS 3,814,881 A * 6/1974 Cherry ................... H01H 33/66
                                                   218/138
4,124,790 A * 11/1978 Kumbera ............. H01H 33/666
                                                   200/302.1
(Continued)

FOREIGN PATENT DOCUMENTS

CN         1158486 A     9/1997
CN       104010916 A     8/2014
(Continued)

OTHER PUBLICATIONS

European Search Report, dated May 27, 2015, 7 pages.
(Continued)

*Primary Examiner* — Edwin A. Leon
*Assistant Examiner* — William Bolton
(74) *Attorney, Agent, or Firm* — Barley Snyder

(57) ABSTRACT

A high voltage circuit breaker comprises a vacuum interrupter module, a drive module, and an actuator. The vacuum interrupter module has a vacuum interrupter housing and a pair of electrical contacts disposed in the vacuum interrupter housing. At least one of the pair of electrical contacts is movable relative to the other of the pair of electrical contacts to engage and disengage the electrical contacts from one another for switching a high voltage on and off. The drive module has a drive module housing and a drive member coupled with the at least one movable electrical contact. A central part of the drive member is disposed in the drive module housing and insulated from an ambient air. The
(Continued)

actuator is coupled to the drive member and moves the pair of electrical contacts relative to one another.

21 Claims, 9 Drawing Sheets

(51) Int. Cl.
  *H01H 9/54* (2006.01)
  *H01H 89/00* (2006.01)
  *B60L 5/18* (2006.01)
(52) U.S. Cl.
  CPC .......... *H01H 89/00* (2013.01); *B60L 2200/26* (2013.01); *H01H 2033/6665* (2013.01); *H01H 2231/026* (2013.01)
(58) Field of Classification Search
  USPC ........ 218/140, 134, 139, 153–155, 118, 123, 218/138
  See application file for complete search history.

(56) References Cited

U.S. PATENT DOCUMENTS

| | | | | |
|---|---|---|---|---|
| 4,150,270 | A * | 4/1979 | Zunick | H01H 33/66 218/138 |
| 4,618,749 | A * | 10/1986 | Bohme | H01H 33/66207 218/134 |
| 5,055,640 | A * | 10/1991 | Lippi | H01H 33/666 218/120 |
| 5,206,616 | A * | 4/1993 | Stegmuller | H01H 33/666 335/126 |
| 5,667,060 | A * | 9/1997 | Luzzi | H01H 33/565 200/302.1 |
| 7,115,831 | B2 * | 10/2006 | Chyla | H01H 1/5833 218/124 |
| 7,829,814 | B2 * | 11/2010 | Marchand | H01H 33/6606 218/140 |
| 8,151,955 | B2 * | 4/2012 | Aubigny | B60L 3/00 191/2 |
| 8,497,446 | B1 | 7/2013 | Glaser | |
| 8,592,708 | B2 * | 11/2013 | Hatanaka | H02B 13/0655 218/153 |
| 9,656,553 | B2 | 5/2017 | Baumann et al. | |
| 2007/0278187 | A1 * | 12/2007 | Siebens | H01H 33/66207 218/118 |
| 2012/0274428 | A1 * | 11/2012 | Reuber | H01H 33/66207 335/6 |
| 2013/0092658 | A1 | 4/2013 | Ache et al. | |
| 2015/0014110 | A1 | 1/2015 | Baumann et al. | |

FOREIGN PATENT DOCUMENTS

| | | |
|---|---|---|
| DE | 102011089812 A1 | 6/2013 |
| EP | 0782160 A2 | 7/1997 |
| JP | H10210615 A | 8/1998 |
| JP | 2003-047113 A | 2/2003 |
| JP | 2004158302 A | 6/2004 |
| JP | 2009-205801 A | 9/2009 |

OTHER PUBLICATIONS

Notice of Reasons for Refusal, English translation, dated Apr. 23, 2018, 5 pages.
Abstract of JP2003047113A, dated Feb. 14, 2003, 1 page.
Abstract of JPH10210615A, dated Aug. 7, 1998, 1 page.
Korean Office Action dated Jun. 21, 2018, 7 pages.
Abstract of JP2004158302A, dated Jun. 3, 2004, 1 page.
Abstract of JP2009205801A, dated Sep. 10, 2009, 1 page.
Chinese First Office Action with English translation, dated Jun. 5, 2018, 20 pages.
European Office Action, European Patent Application No. 14 195 293.7, dated Jul. 17, 2017, 7 pages.

\* cited by examiner

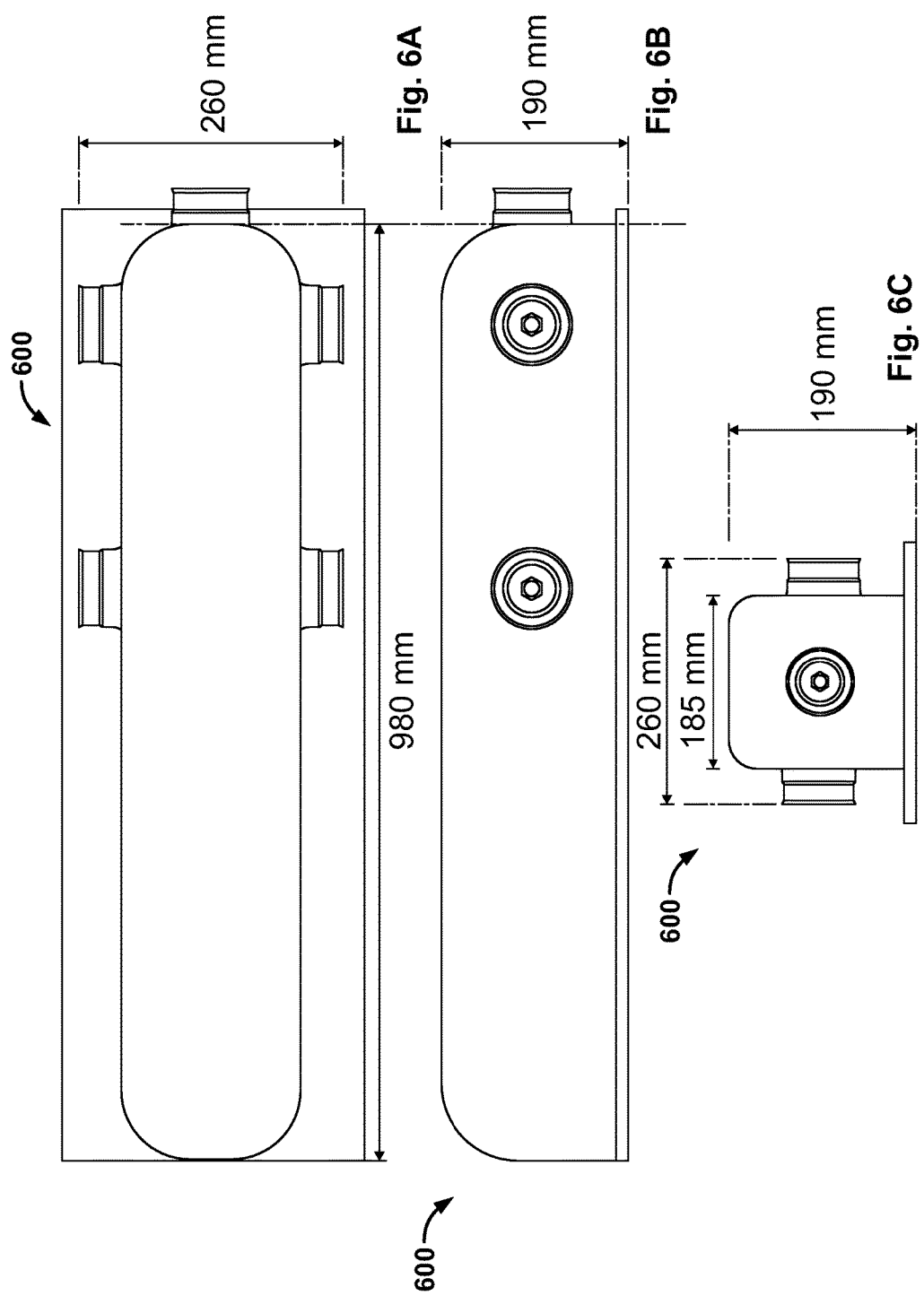

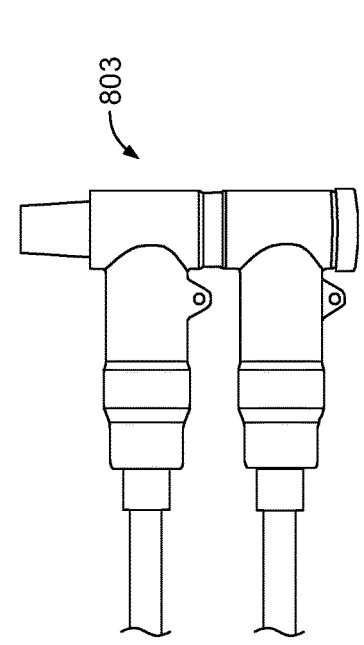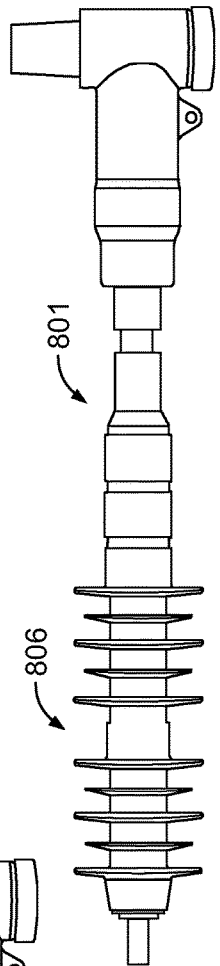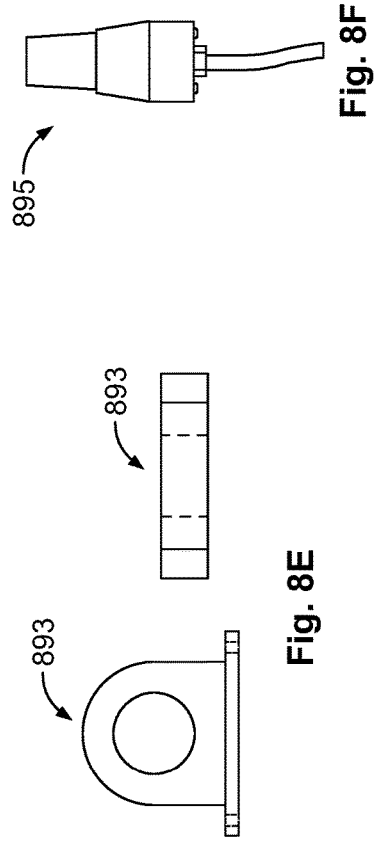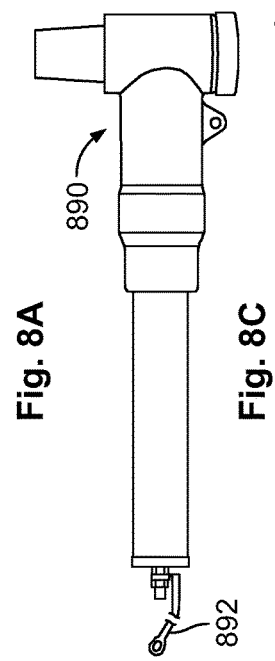

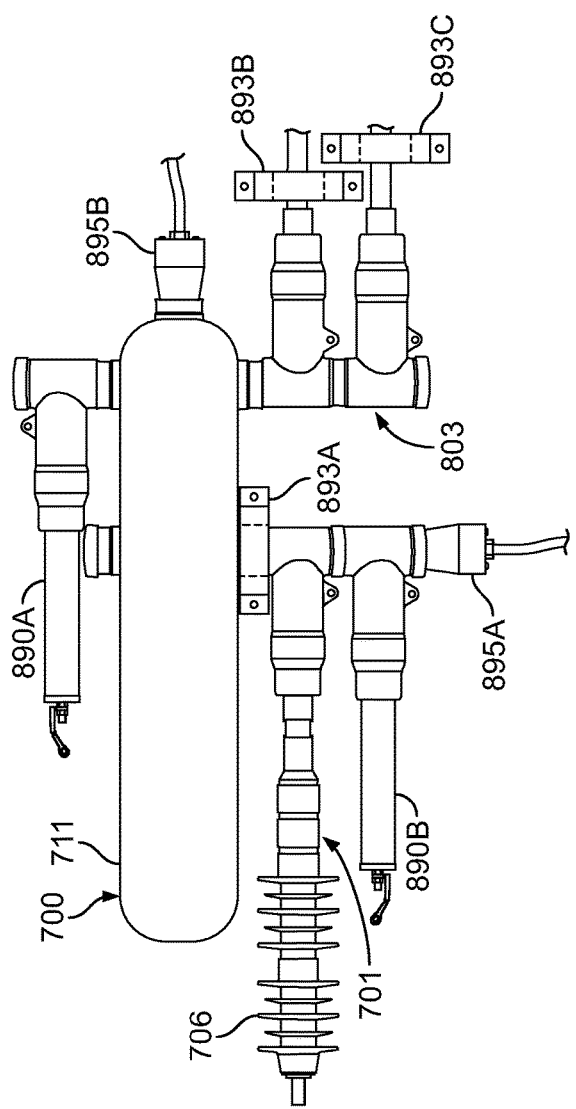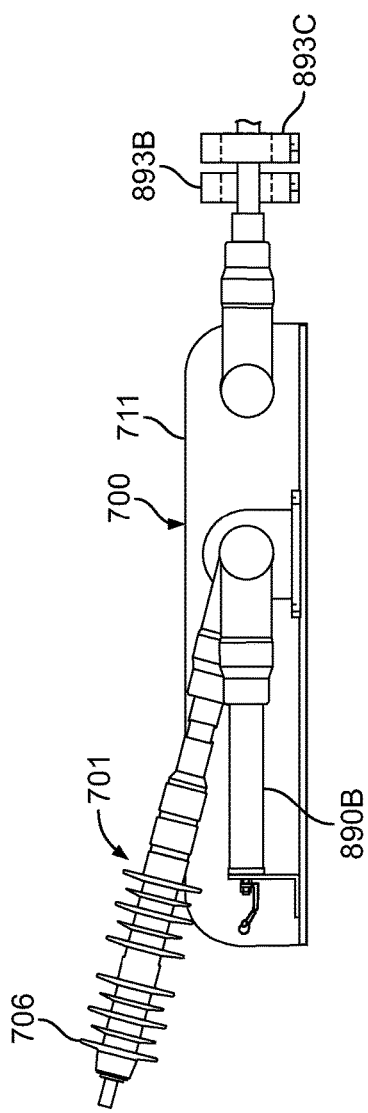
Fig. 9A
Fig. 9B

HIGH VOLTAGE CIRCUIT BREAKER, SYSTEM, VACUUM INTERRUPTER MODULE AND ASSOCIATED DRIVE MODULE

CROSS-REFERENCE TO RELATED APPLICATIONS

This application is a continuation of PCT International Application No. PCT/EP2015/077489, filed on Nov. 24, 2015, which claims priority under 35 U.S.C. § 119 to European Patent Application No. 14195293.7, filed on Nov. 27, 2014.

FIELD OF THE INVENTION

The present invention relates to a circuit breaker and, more particularly, to a circuit breaker and related electric equipment for a railway using a high voltage alternating current electrification system, such as standard 15 kV and 25 kV AC systems.

BACKGROUND OF THE INVENTION

There are many voltage systems used for railway electrification around the world. Several railways in the world have an AC voltage higher than 10 kV and several lines with a voltage higher than 25 kV. Throughout the specification, these voltages, or other voltages higher than 10 kV, are referred to as "high". Further, term "circuit breaker" shall mean "high voltage circuit breaker".

Typically, a railway car connects to a power line via a pantograph, with the connection switchable by a circuit breaker. In such a field as electrical power distribution, the circuit breaker is often understood as a device which switches off the current in case of maintenance, short circuit tripping, or another abnormality. However, in the field of train electrification, the circuit breaker is a regularly operated controllable switch. The railway train circuit breaker must have high durability, since such a device is operated routinely and on a daily basis. A train circuit breaker may be required to perform several hundred-thousand switching cycles over its working life, a factor of more than a thousand times that required of circuit breakers in some other fields.

A conventional high AC voltage railway circuit breaker includes a pair of contacts in a vacuum. When the circuit is to be switched on, the contacts engage in mechanical connection. The vacuum enables switching of high voltages within a small and durable device that confines and minimizes high voltage arcing. Typically, the circuit breaker is placed on the roof of a train car and negatively affects train aerodynamics.

SUMMARY

An object of the invention, among others, is to provide a high voltage circuit breaker that is compact, durable, has a simple structure, and provides decreased air resistance. A high voltage circuit breaker according to the invention comprises a vacuum interrupter module, a drive module, and an actuator. The vacuum interrupter module has a vacuum interrupter housing and a pair of electrical contacts disposed in the vacuum interrupter housing. At least one of the pair of electrical contacts is movable relative to the other of the pair of electrical contacts to engage and disengage the electrical contacts from one another for switching a high voltage on and off. The drive module has a drive module housing and a drive member coupled with the at least one movable electrical contact. A central part of the drive member is disposed in the drive module housing and insulated from an ambient air. The actuator is coupled to the drive member and moves the pair of electrical contacts relative to one another.

BRIEF DESCRIPTION OF THE DRAWINGS

The invention will now be described by way of example with reference to the accompanying figures, of which:

FIG. 6A is a top view of a circuit breaker assembly;

FIG. 6B is a side view of the circuit breaker assembly of FIG. 6A;

FIG. 6C is a front view of the circuit breaker assembly of FIG. 6A;

FIG. 8A is a side view of a high voltage cable termination of the circuit breaker system;

FIG. 8B is a side view of a double stacked high voltage cable termination of the circuit breaker system;

FIG. 8C is side view of a screened surge arrestor of the circuit breaker system;

FIG. 8D is a side view of a termination bushing assembly of the circuit breaker system;

FIG. 8E is a side view of a current transducer of the circuit breaker system;

FIG. 8F is a side view of a screened voltage transducer of the circuit breaker system;

FIG. 9A is a top view of a portion of the circuit breaker system of FIG. 7A; and FIG. 9B is a side view of the portion of the circuit breaker system of FIG. 9A.

DETAILED DESCRIPTION OF THE EMBODIMENTS

Figures 1A, 1B:
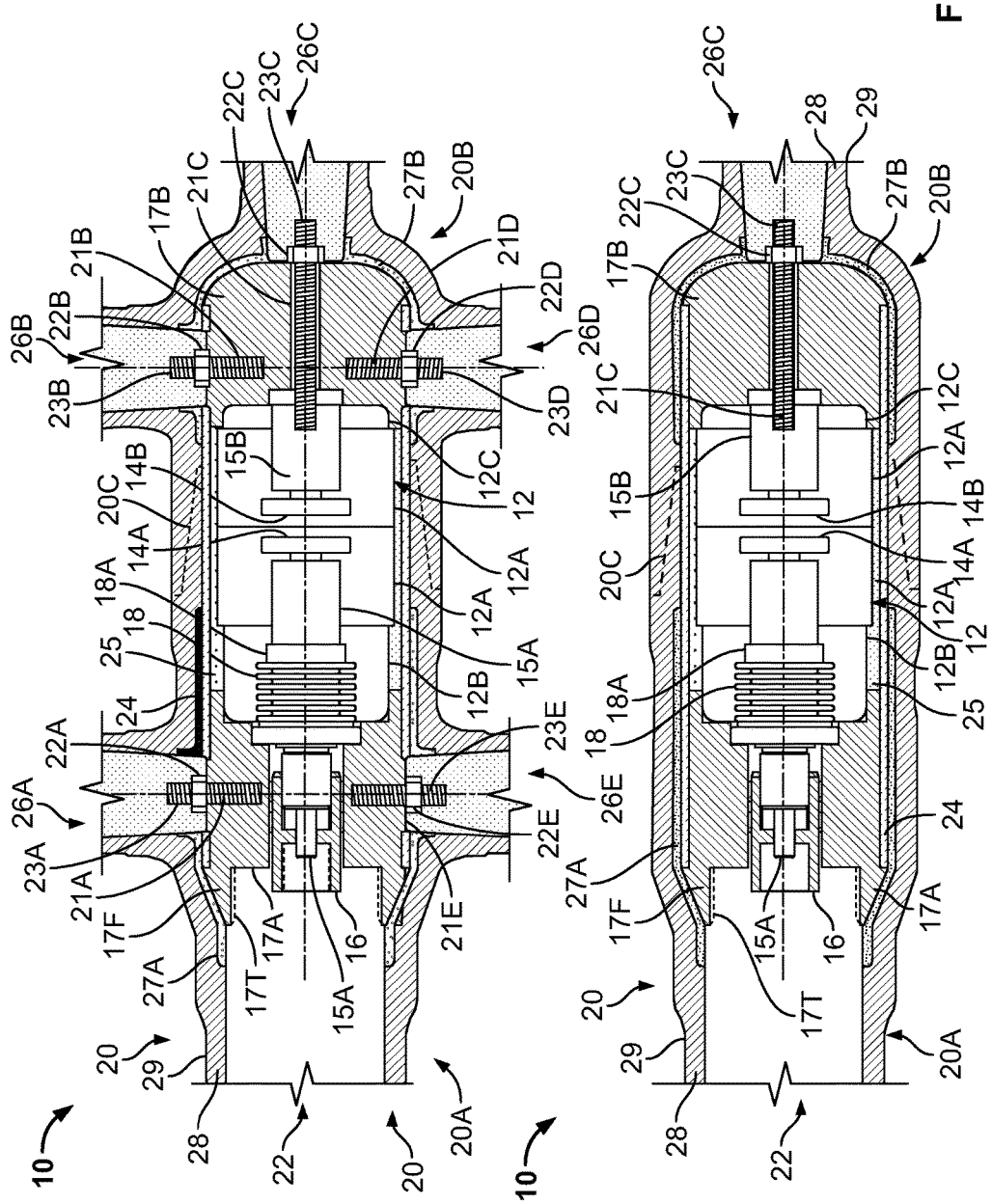
FIG. 1A is a sectional top view of a vacuum interrupter module of a high voltage circuit breaker according to the invention.
FIG. 1B is a sectional side view of the vacuum interrupter module of FIG. 1A.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Figure 4A:
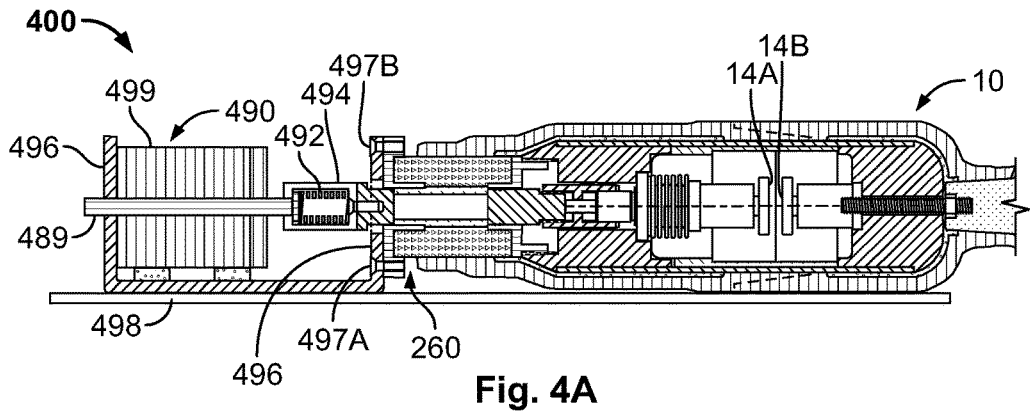
FIG. 4A is a sectional view of the high voltage circuit breaker having the drive module of FIGS. 2A and 2B in an open state.
Figure 4B:
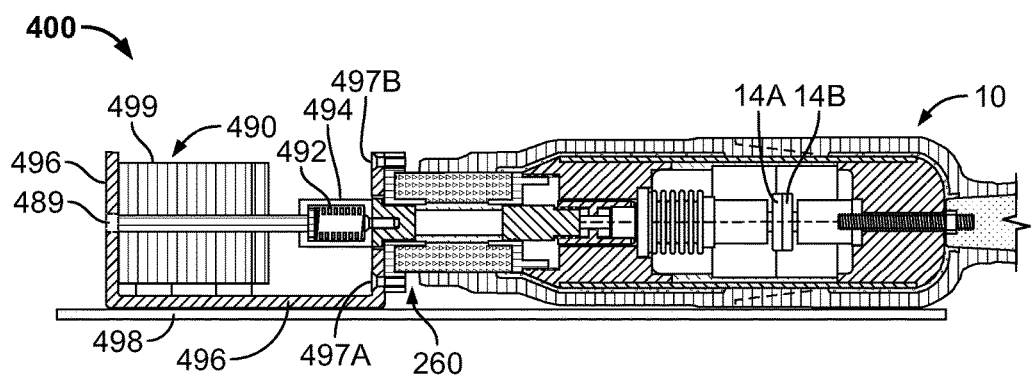
FIG. 4B is a sectional view of the high voltage circuit breaker of FIG. 4A in a closed state.

A high voltage circuit breaker 400 for railways according to the invention is shown in FIGS. 4A and 4B. The circuit breaker 400 includes a vacuum interrupter module 10, a drive module 260, and an actuator 490. The major components of the invention will now be described in greater detail.

The vacuum interrupter module 10 is shown in FIGS. 1A and 1B. The module 10 includes a vacuum interrupter housing 12 incorporating two electrical contacts with faces 14A and 14B in the housing 12. Moving contact with face 14A is movable relative to the contact with face 14B, allowing the two electrical contacts to engage and disengage for making and breaking a high voltage connection. In FIGS. 1A and 1B contacts with faces 14A and 14B are disengaged.

For efficient use of the vacuum interrupter module 10, the pressure of gas in the vacuum interrupter housing 12 is normally in the high vacuum range, or the ultra-high vacuum range. In FIGS. 1A and 1B the housing 12 has a ceramic section 12A and conductive vacuum bottle end caps 12B and 12C. The housing 12 has a bellows 18 to provide a vacuum-tight seal for the moving contact with face 14A. The bellows 18 includes a bellows flange 18A and may be formed of a conductive material.

The movable contact in vacuum interrupter module 10 has a movable contact stem 15A, with which the movable contact is coupled to the drive module 260, as described in greater detail below. Contact face 14A is at a first end of the movable contact and movable contact stem 15A protrudes from a second end of the movable contact. Movable contact stem 15A is inserted into and protrudes through bellows 18, and protrudes from vacuum interrupter housing 12.

Vacuum interrupter module 10 includes a sliding contact member 16 for mechanically coupling movable contact stem 15A with the drive module 260, and for electrical connection to connection block 17A, to which contact member 16 is slidably attached. Sliding contact member 16 is firmly attached to movable contact stem 15A by screw thread or other form of connection known to those with ordinary skill in the art. Sliding contact member 16 is made of metal.

Figure 2A:
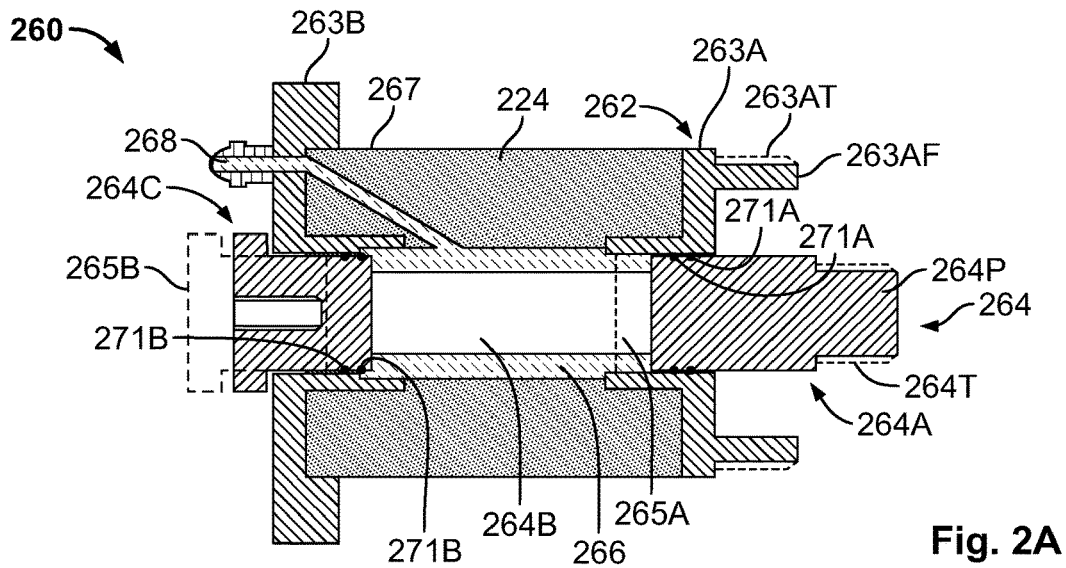
FIG. 2A is a side sectional view of a drive module of the high voltage circuit breaker.
Figure 3:
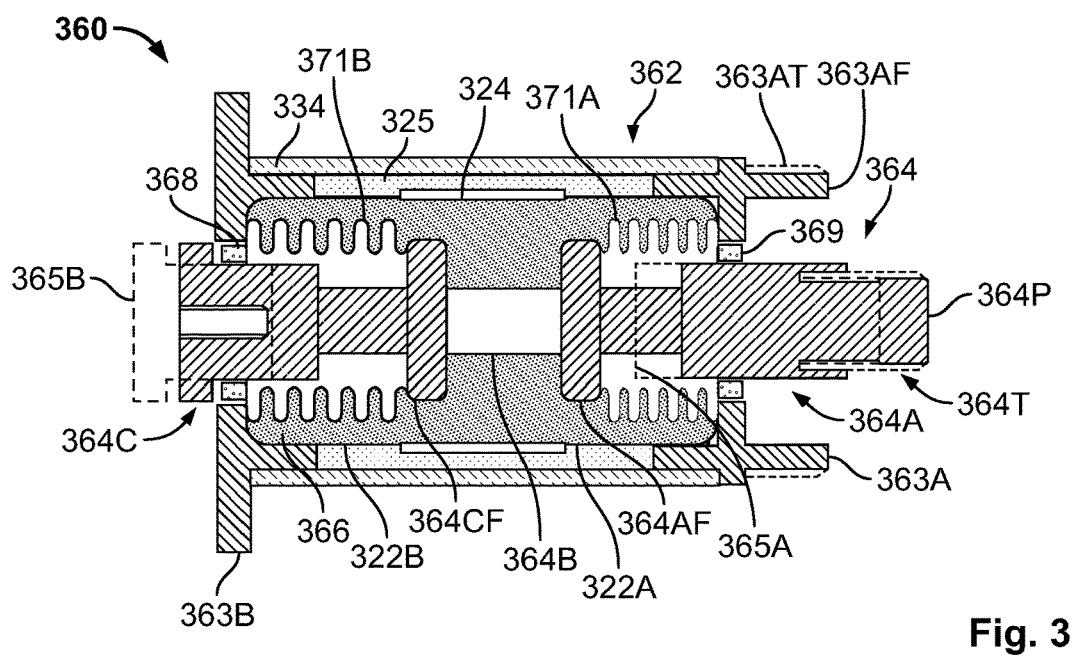
FIG. 3 is a side sectional view of another drive module of the high voltage circuit breaker.

Connection block 17A is a cylindrical component that may be formed from one or more parts of conductive material, such as metal. The slidable attachment between the connection block 17A and contact member 16 may be formed by ribs and slots. The connection block 17A is shaped for mechanically engaging with a drive module housing 262 of a drive module 260, shown in FIG. 2A, or a drive module housing 362 of a drive module 360, shown in FIG. 3. A connection block cavity flange 17F of the connection block 17A has a female thread 17T engaging with a male thread 263AT or 363AT of a drive module housing 262 or 362, as shown in FIGS. 2A and 3 and described in greater detail below.

In vacuum interrupter module 10 there is at least one electrical path between electrical contact face 14A and connection block 17A via sliding member 16 and contact stem 15A. In another example, the electrical path includes a part of contact stem 15A and bellows 18. Most or all of the current, for example more than 80% of the current, passes though the sliding member 16.

The vacuum interrupter module 10 further includes headless conductive screws 21A and 21E screwed into connection block 17A and held in place by nuts 22A and 22E. Alternatively, the screws 21A, 21E may be integrally formed incorporating hexagonal flats at a suitable position along the screw thread. Screws 21A and 21E have, respectively, protruding portions 23A and 23E presenting connection studs. External devices may be electrically coupled to the movable contact with face 14A via the protruding portions 23A, 23E.

The static electrical contact with face 14B has a fixed contact stem 15B held in place by vacuum interrupter housing 12. The connection of fixed contact stem 15B with vacuum interrupter housing 12 is vacuum-tight. Electrical contact with face 14B is electrically coupled to a contact outside of vacuum housing 12, in the shown embodiment, to a headless conductive screw 21C for connecting to outside connectors such as screened cables. Screw 21C is screwed through a conductive block 17B, and fixed in this block 17B with a nut 22C. The block 17B accommodates two more conductive screws 21B and 21D held in place by nuts 22B and 22D, respectively.

Vacuum interrupter module 10 further includes a structural insulating cylinder 24. It may be made of glass-fiber reinforced polymer ("GFP"). The space between cylinder 24, vacuum interrupter housing 12, and contact blocks 17A and 17B is filled with a void-free dielectric filler 25.

Vacuum interrupter module 10 includes an encapsulation 20. The encapsulation 20, as shown in FIGS. 1A and 1B, has an insulating layer 28, a conductive layer 29, and a plurality of apertures or ports 26A, 26B, 26C, 26D and 26E to allow electrical connections to contacts with faces 14A and 14B. The number of apertures 26A, 26B, 26C, 26D and 26E may vary. Encapsulation 20 has an opening 22 for receiving, at least partially, the drive module 260, as described in greater detail below. The opening 22 is formed by an encapsulation segment 20A protruding from structural insulating cylinder 24 and contact block 17A. Conductive layer 29 is an outer layer with respect to insulating layer 28. The encapsulation 20 may include stress control layers 27A and 27B. In the shown embodiment, the encapsulation 20 is formed of rubber. With the encapsulation 20, the vacuum interrupter module 10 shields the outer surface of the vacuum interrupter module 10 from the high voltage electric field.

Each aperture 26A, 26B, 26C, 26D and 26E may receive, for example, a high voltage bushing and/or a screened separable connector of 'T' or straight form. The apertures 26A, 26B, 26C, 26D and 26E are distributed around the vacuum interrupter module 10 to facilitate a specific positioning of the circuit breaker 400. For example, in vacuum interrupter module 10, aperture 26C is axial. Such aperture 26C may be used in case the circuit breaker 400 is positioned horizontally. The vacuum interrupter module 10 may be made without apertures 26A, 26B, 26C, 26D and 26E on an elongated side of the module 10 which may be used for mounting the circuit breaker 400, for example, horizontally on a vibration isolation mounting. Unused apertures 26A, 26B, 26C, 26D and 26E may be closed with screw in plugs that fill the aperture void and which provide electrical insulation and which are fitted with covers that are conductive or which have a conductive screen. Such a cover will ensure continuity of the circuit breaker screen over the unused aperture.

The insulating layer 28 of the encapsulation 20 may be made of, for example, silicone rubber. The conductive layer 29 may be, for example, a silicone conductive coating or other conductive polymer or substance that will form a lasting bond to the insulating layer 28. The stress control layers 27A, 27B may be made of, for example, a stress control with high permittivity materials or non-lineal zinc oxide coated layers. The encapsulation 20 may be an over-moulding bonded to the inside parts of the vacuum interrupter module 10, such as structural insulating cylinder 24. The encapsulation 20 may be made as a single piece or it may be composed of several pieces. In the shown embodiment, the encapsulation 20 is composed of two pieces, with an interface 20C between pieces 20A and 20B of the encapsulation. Such an interface, if used, may include a dielectric grease.

Figure 2B:
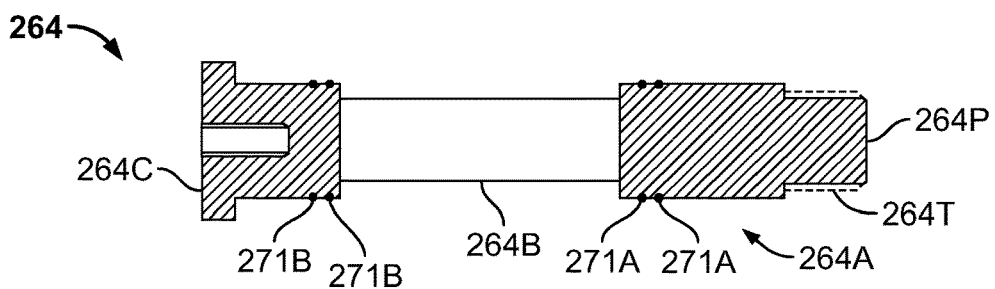
FIG. 2B is a sectional view of a drive member of the drive module of FIG. 2A.

The drive module 260 is shown in FIGS. 2A and 2B. The drive module 260 includes a drive module housing 262 and a drive member 264.

The drive member 264 is mechanically coupleable with electrical contact with face 14A. The coupling between drive member 264 and the electrical contact with face 14A includes sliding contact member 16 and movable contact stem 15A of the vacuum interrupter module 10. The drive member 264, as shown in FIG. 2B, has a first end part 264A, an opposite second end part 264C, and a central part 264B disposed between the first end part 264A and the second end part 264C. The drive member 264 may be a rod and may have various cross-sections, such as circular or rectangular.

The first end part 264A has a cylindrical protrusion 264P. The first end part 264A engages with sliding contact member 16. The drive member 264 is attached to the sliding contact member 16 using threads; cylindrical protrusion 264P of the drive member has a thread 264T, which matches a thread in sliding contact member 16. In other embodiments, the first end part 264A and the sliding contact member 16 may have different matching shapes, for example, the sliding contact member 16 may have a protrusion 264P instead of the cylindrical cavity at the interface with the drive member 264 and the drive member 264 may have a cavity attachable to this protrusion.

The second end part 264C is shaped to fit the actuator 490. In the embodiment shown in FIG. 2B, the second end part 264C is cylindrical and may have a protrusion or a cavity with a thread. End parts 264A and 254C also can be called end fittings of the drive member 264. The first end part 264A and the second end part 264C are formed of electrically conductive materials such as metals.

The central part 264B of the drive member 264 electrically insulates the first end part 264A from the second end part 264C. The central part 264B is also insulated from ambient air. The central part 264B is formed from glass reinforced plastic ("GRP") or glass-filled nylon.

The drive member 264, as shown in FIG. 2A, is sealably attached to the drive module housing 262, so as to prevent the leakage of an insulating material from the housing 262 or its contamination from outside. As shown in FIG. 2A, drive module housing 262 includes a sealable gland 268 for introducing and extruding electrically insulating material into drive module housing 262. The drive module 260 is connected to an external reservoir or pressure vessel, to maintain even pressure and minor seepage replenishment. Alternatively, the drive module housing 262 omits such channel. The central part 264B is immersed into an insulating fluid 266 introduced into the sealable gland 268, such as dielectric liquid or gel like silicone oil, when the circuit breaker 400 is used. The drive member 264 includes piston seals 271A and 271B to seal to the drive module housing 262. The piston seals 271A, 271B may be made of, for example, polytetrafluoroethylene ("PTFE").

The drive module housing 262 attaches to the vacuum interrupter module 10, as shown in FIGS. 4A and 4B. A flange 263AF of the drive module housing 262 engages with connection block 17A. The drive module housing 262 is inserted into opening 22 in vacuum interrupter module 10 and rotated so that thread 263AT of the flange 263AF will engage into thread 17T of the connection block 17A. The drive module housing 262 has a shape complementary to the encapsulation 20 of the vacuum interrupter module 10. Drive member 264 can be independently rotated so that thread 264T engages into the thread in sliding contact member 16. In such configuration, it is possible to obtain a mechanical coupling of sufficient strength and correct adjustment.

The drive module housing 262, as shown in FIG. 2A, has several parts. Drive module housing 262 includes a housing body 224, a first end fitting 263A having flange 263AF, a second end fitting 263B, and a conductive layer 267. The housing body 224 electrically insulates ends of the housing 262 from each other and ends of drive member 264 from each other. The housing body 224 is made of, for example, plastic, such as ertalyte. Alternatively, the housing body 224 may be made of another rigid insulating material known to those with ordinary skill in the art. The end fittings 263A, 263B are made of conductive material, for example, metal, and build a shield around the high-voltage parts of the circuit breaker 400. The end fittings 263A, 263B may be, for example, bonded, crimpled or screwed to the housing body 224. Conductive layer 267 further contributes to the shielding around the high-voltage parts of the circuit breaker 400.

The first end part 264A and the second end part 264C also aid in building a shield around the high-voltage parts of the circuit breaker 400.

In FIG. 2A, the drive member 264 is in its rightmost position with respect to the drive module housing 262. When drive member 264 is in such position, and drive module 260 and the vacuum interrupter module 10 are joined for forming the high voltage circuit breaker 400, electrical contact face 14A is engaged with electrical contact face 14B as shown in FIG. 4B. Drive member 64 may be moved into a leftmost position; in this case end fitting 264C will reach dashed line 265B and the left edge of fitting 264A and the right edge of insulating part 264B of the drive member will reach dashed line 265A. When drive member 264 reaches such a position, electrical contacts faces 14A and 14B are disengaged as shown in FIG. 4A.

When drive module 260 and vacuum interrupter module 10 are joined for forming the circuit breaker 400, and the vacuum interrupter module 10 has an encapsulation 20, the encapsulation 20 may not extend to the end fitting 263B in FIG. 2A. This would increase the contribution which conductive layer 267 makes to the screening. The conductive layer 267 may be a layer of semi-conductive paint. An interface between the drive module housing 262 and the encapsulation 20 may be greased to provide a tracking resistant electrical seal.

The insulated drive module 260 may be designed to operate for more than 250,000 cycles without maintenance. It may have 200 kV or higher basic insulation level (BIL) rating to suit 25 kV rail high voltage insulation requirements. It may be replaceable, due to the selected mechanical connections with the vacuum interrupter module 10 and the actuator 490.

Another drive module 360 according to the invention is shown in FIG. 3. Drive module 360 is also coupleable with vacuum interrupter module 10. Drive module 360 includes a drive module housing 362 and an electrically insulating drive member 364. Drive module housing 362 includes flange 363AF similar to flange 263AF in FIG. 2A. Also, drive module housing 362 includes protrusion 364P similar to protrusion 264P in FIG. 2A. Additionally, threads 363AT and 364T are similar to the respective threads 263AT and 264T in FIG. 2A. Thus, drive module 360 may be coupled with vacuum interrupter module 10.

Drive member 364 includes parts 364A, 364B and 364C. Drive member part 364B electrically insulates parts 364A and 364C from each other. Also, a part of the drive member, in particular the part composed from insulating part 364B, a section 364AF of end part 364A, and a section 364CF of end part 364C are insulated from ambient air. Drive module housing 362 includes bellows 371A and 371B tightly attached to sections 364AF and 364CF. The bellows 371A, 371B may be made of stainless steel. When drive member 364 moves to its leftmost position, it reaches dashed line 365A by the thick section of its part 364A and dashed line 365B by its part 364C in FIG. 5. Insulating part 364B and sections 364AF and 364CF move the same distance in the direction of dashed line 365B.

The part of drive member 364 insulated from ambient air may be immersed into insulating material 366, such as gas, or it may be surrounded by a vacuum different from the vacuum in the vacuum interrupter module 10. The gas may be sulfur hexafluoride (SF6). It may be under pressure exceeding atmospheric. The vacuum in the drive module housing 362 may have a higher pressure of gas than the vacuum in the vacuum interrupter module 10.

Drive module housing 362 additionally includes an insulating body 324, which may be ceramic. Drive module housing 362 also includes caps 322A and 322B, which may be conductive, for example, made of metal. It further includes insulating or dielectric filler 325, electrically insulating tubing 334, and guide collars 368 and 369 for the drive member 364. End fittings 363A and 363B are different in shape from end fittings 263A and 263B, but they may be conductive as well, for example, made of metal. A conductive layer similar to layer 267 may be added to tubing 334 near end fitting 363B.

The assembled high voltage circuit breaker 400 is shown in FIGS. 4A and 4B. Circuit breaker 400 includes vacuum interrupter module 10 engaged with drive module 260, and an actuator 490 coupled with the drive member 264 of the drive module 260 for moving the electrical contacts having faces 14A, 14B relative to one another to engage or disengage electrical contacts 14A and 14B. In FIG. 4A the contacts are disengaged. In FIG. 4B these contacts are engaged.

The actuator 490 is coupled with the drive member 264 via a contact pressure spring 492 kept in a casing 494. The actuator 490 has a body 499 and a shaft 489. The body 499 is in a fixed position with respect to the drive module housing 262. This position is maintained with a holding bracket 496, attached to the drive module housing 262 with screws or bolts 497A and 497B. The actuator 490 may include a position sensor for determining the shaft 489 position. The actuator may include a socket for receiving control signals.

The circuit breaker 400, as shown in FIGS. 4A and 4B, may be mounted on a base plate 498. The circuit breaker 400 may be mounted to a train car with a vibration isolating mounting.

Figure 5:
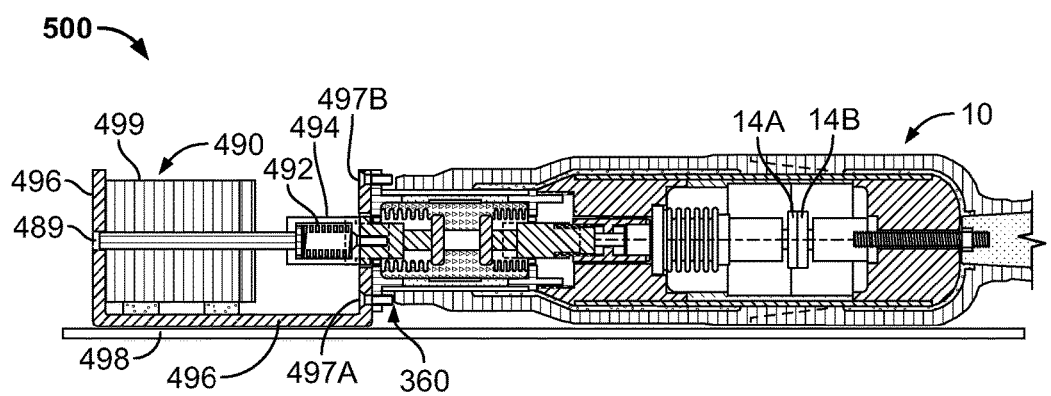
FIG. 5 is a sectional view of another high voltage circuit breaker having the drive module of FIG. 3.

A high voltage circuit breaker 500 according to another embodiment of the invention is shown in FIG. 5. The circuit breaker 500 includes the vacuum interrupter module 10 engaged with the drive module 360 described above with reference to FIG. 3.

A circuit breaker assembly 600 shown in FIGS. 6A-6C includes the circuit breaker 400 described above with a protective case fitted over the circuit breaker 400. Circuit breaker assembly 600 may be mounted horizontally on a roof of a train car, or off-roof, or under an aerodynamic cover. The circuit breaker assembly 600 has a height not exceeding 190 mm, a breadth not exceeding 185 mm in areas without apertures, and a breadth not exceeding 260 mm in areas with apertures. The circuit breaker assembly 600 also has a length not exceeding 980 mm. The shielding in the circuit breaker assembly 600 is grounded.

Figure 7A:
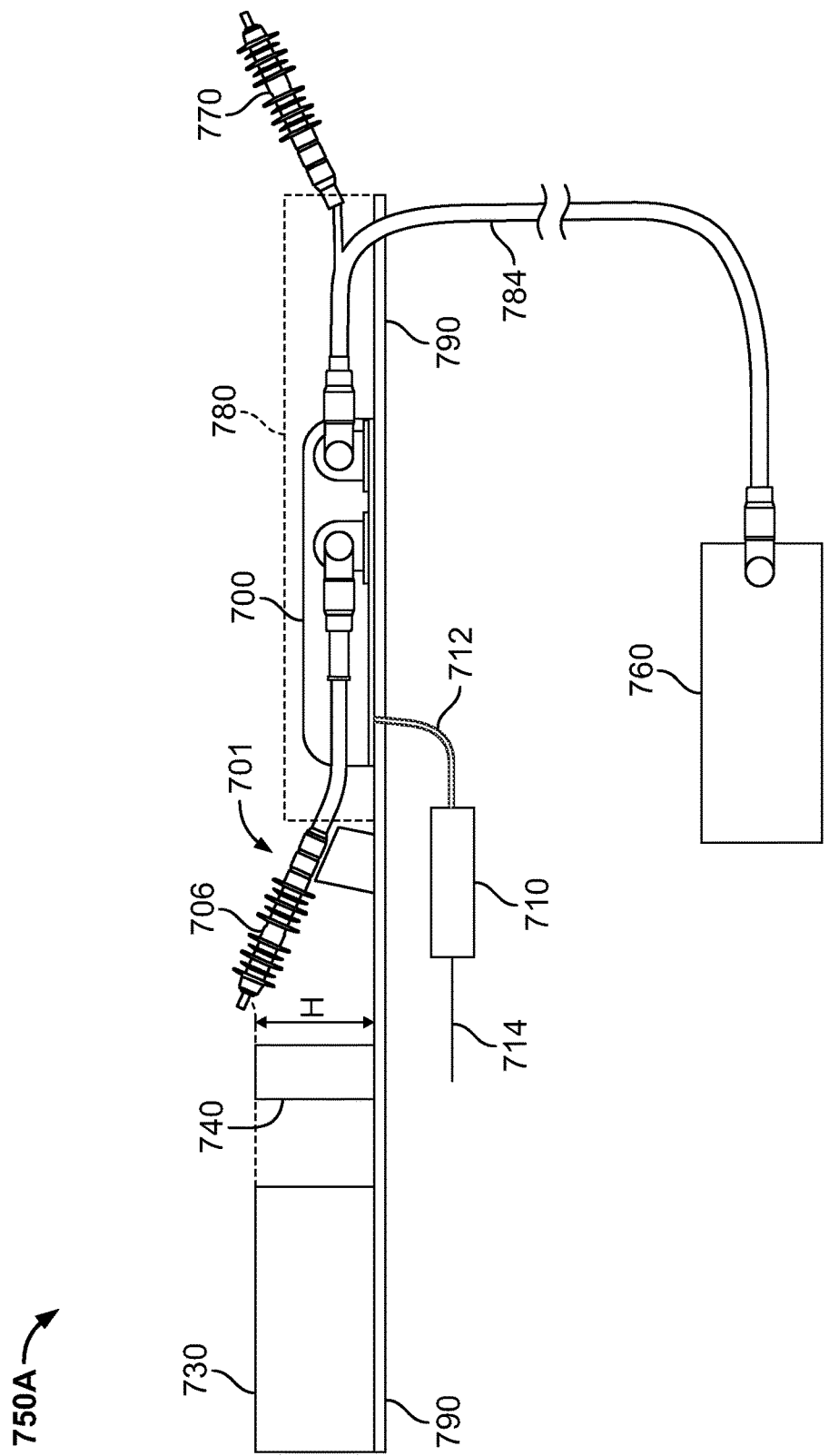
FIG. 7A is a side view of a circuit breaker system.
Figure 7B:
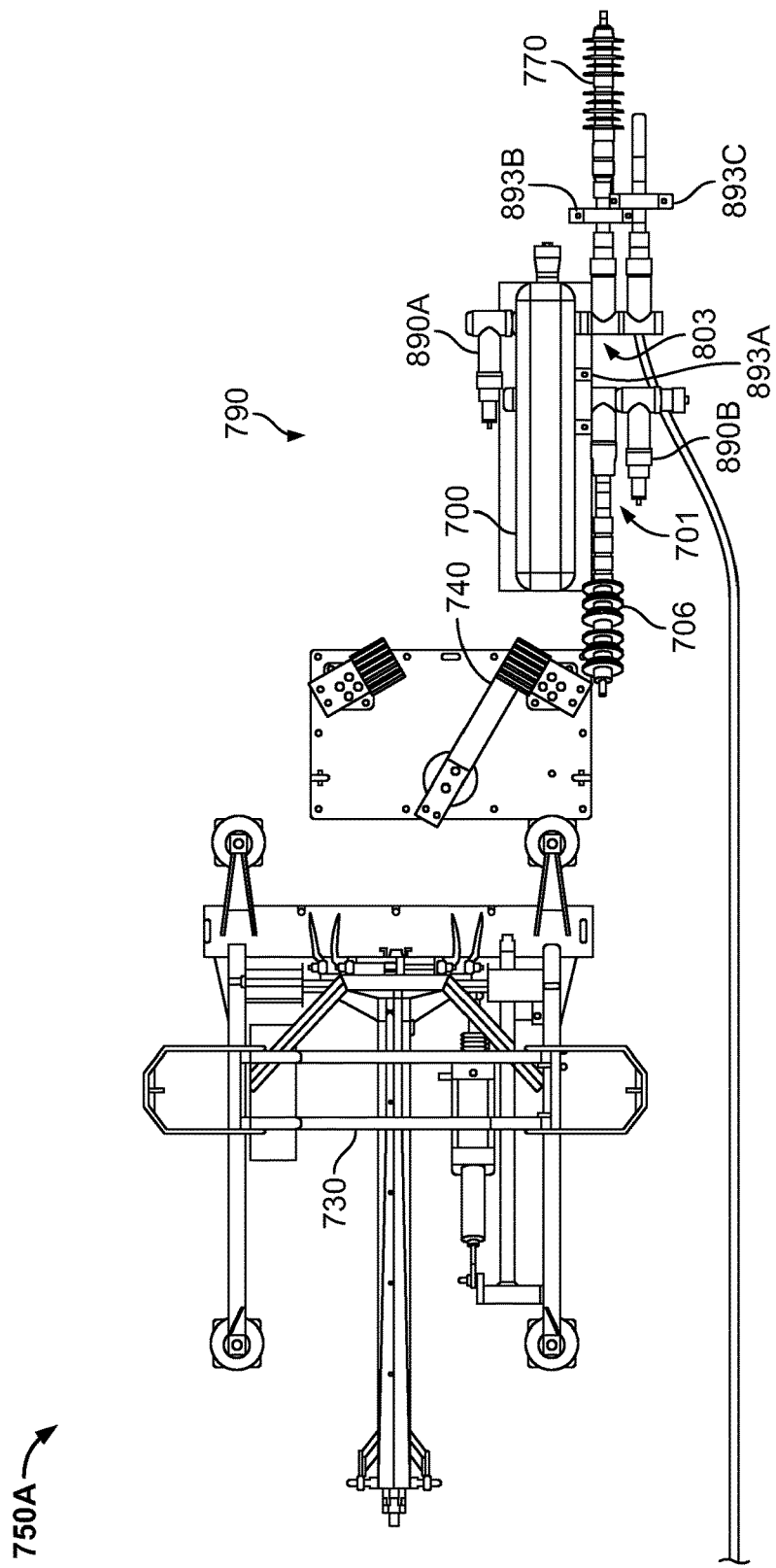
FIG. 7B is a top view of the circuit breaker system of FIG. 7A.

A circuit breaker system 750A according to the invention including at least a circuit breaker 700 and a control unit 710 is shown in FIGS. 7A and 7B. The control unit 710 instructs an actuator of the circuit breaker 700 to engage or disengage the electrical contacts in the vacuum interrupter module.

The circuit breaker 700, as shown in FIG. 7A, may be placed horizontally on a roof 790 of a train car, and the control unit 710 may be placed under the roof 790 of the train car. The control unit 710 sends control signals to the circuit breaker 700 via a circuit breaker control connection 712. Control unit 710 receives signals from the train via a train control connection 714. The control unit 710 may include a socket for connecting the control unit 710 to a train power supply. Additionally or alternatively, the control unit 710 may be connected to its own power supply, for example, a battery and/or a solar power generator.

The circuit breaker 700 is connected to a pantograph 730 via a grounding switch 740. The high voltage from the circuit breaker 700 is transmitted through a screened high voltage cable 784 to an underfloor traction transformer 760. Also, it may be transmitted to another car, via an inter-car jumper 770.

A height, where the unprotected connection from the pantograph 730 and grounding switch 740 ends, is marked as height H. Circuit breaker 700 is connected to grounding switch 740 via a bushing assembly 701 including a cable termination bushing 706. The bushing assembly 701 is a rigid termination bushing assembly.

The circuit breaker 700 may have a protective cover, schematically shown with dashed line 780. The cover 780 may be aerodynamic to decrease the air resistance of the circuit breaker system 750A and provides mechanical protection for a screened cable 784, which is placed on the roof 790 of the train car. Additionally or alternatively, the cover 780 protects the circuit breaker 700 from environmental influences, such as caused by pollution, sun, or rain.

The circuit breaker system 750A, as shown in FIG. 7B, additionally includes current transducers 893A, 893B and 893C, screened surge arrestors 890A and 890B, and screened voltage transducers or probes 895A and 895B. Current transducer 893A measures a total current through circuit breaker 700. Current transducers 893B and 893C measure currents flowing into different circuit branches; current transducer 893B measures the current flowing through intercar jumper 770, and current transducer 893C measures the current flowing to underfloor traction transformer 760. Such branching is arranged with a double stack cable termination 803. The double stack cable termination 803 may be composed of two separable cable screened connectors. These elements will be described in greater detail below with reference to FIGS. 8A-8E.

A portion of the circuit breaker system 750A is shown in detail in FIGS. 9A and 9B. Circuit breaker 700 has five apertures on its sides. It has no apertures on its top elongated part and on the bottom elongated part. Circuit breaker 700 is packed into a protective case 711.

Figure 7C:
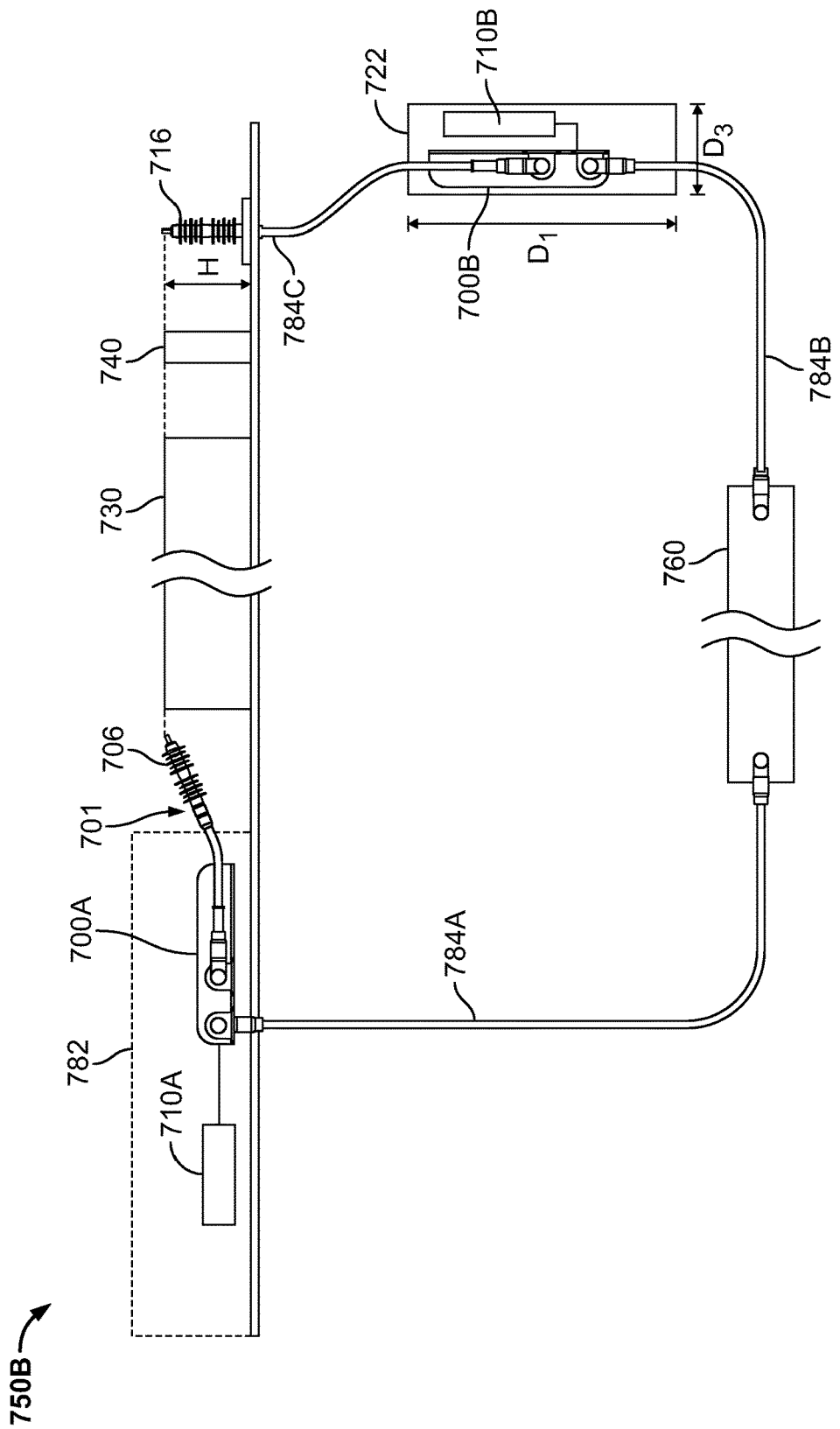
FIG. 7C is a side view of another circuit breaker system.

A circuit breaker system 750B according to another embodiment of the invention is shown in FIG. 7C. The system 750B includes two circuit breakers, 700A and 700B connected to underfloor traction transformer 760 via screened cables 784A and 784B, respectively. Like reference numerals with respect to the circuit breaker system 750A shown in FIGS. 7A and 7B indicate like elements, and only the differences will be described in greater detail.

The circuit breaker 700A and the control unit 710A of the circuit breaker system 750B may be placed on the roof of the train car. In other embodiments, the circuit breaker 700A and the control unit 710A may be placed under a cover 782 or a roof outline if the roof is curved. Both the circuit breaker 700B and the control unit 710B may be placed under the roof of the train car.

The circuit breaker 700A and the control unit 710A, as shown in FIG. 7C, may be placed in a compartment 722. The circuit breaker 700A may be connected to pantograph 730 via a roof bushing 716 and screened cable 784C. The connection of the circuit breaker 700A to the pantograph 730 may not include a grounding switch. The circuit breaker 700A may be oriented vertically. The compartment 722 does not need to electromagnetically shield the circuit breaker 700A, i.e. it may have a dielectric wall. The distance from the circuit breaker 700A to such a wall may be smaller than height H and may be even zero.

Based on the geometrical parameters of the circuit breaker 600 described above with reference to FIGS. 6A-6C, a biggest dimension D1 of the compartment 722 is less than 120 cm. A second biggest dimension is less than 100, 50 or even 35 cm. A third biggest dimension D3 is less than 80, 40 or even 20 cm. The smallest dimensions may be used in combination.

Several devices and components used in the circuit breaker system 750A, 750B are shown in FIGS. 8A-8F.

A high voltage cable termination 802 is shown in FIG. 8A. This termination 802 may also be called a cable screened separable connector. An end 802A of this termination 802 is complementary to one or more apertures 26A, 26B, 26C, 26D and 26E of the circuit breaker 400. The voltage cable termination may be a RSTI-CC-68 model. A double stack high voltage cable termination 803 is shown in FIG. 8B. The voltage cable termination may be a RSTI-CC-68 model.

A screened surge arrester 890 is shown in FIG. 8C. A grounding lead 892 of the surge arrester 890 is grounded. Surge arrestor 890 is similar to surge arrestors 890A and 890B shown in FIG. 7B. The surge arresters 890 may be a RSTI-SA-10 model.

A rigid termination bushing assembly 801 is shown in FIG. 8D. The assembly may be a RSTI-CC-68 model.

A current transducer or probe 893 is shown in FIG. 8E. The current transducer 893 is similar to current transducers 893A, 893B and 893C shown in FIG. 7B.

A screened voltage transducer or probe 895 is shown in FIG. 8F. The screened voltage probe 895 is similar to screened voltage probes 895A and 895B shown in FIG. 7B. The voltage transducer or probe 895 measures a voltage bias between the two or more electrical contacts.

The control unit 710 processes measurement results from the current transducers 893 and a voltage transducer 895 to detect a loss of the vacuum in the vacuum interrupter housing 12 and/or a tripping condition. In some cases, the voltage and/or current probe 893, 895 do not have to be connected to the control unit 710. These devices may be used for metering energy, which may be done not only by the control unit 710, but by an energy meter as well. Further, the results of the measurements may be logged. Such data may be used for service history, condition monitoring, and fault analysis. The voltage transducer 895 may further be used to provide signals for train system control, faulty circuit breaker detection, and/or precise timing of circuit breaker operation with respect to voltage cycle and/or harmonic voltage monitoring during new train testing. The voltage probe signals, when sent to the circuit breaker control unit 710, may be used to disengage the movable contact in the vacuum interrupter module 10, for example, so as to react to loss of power or a control card fault.

Advantageously, in the circuit breakers according to the present invention, the circuit breaker has a decreased size in comparison to circuit breakers in the prior art. Due to the reduced size, the circuit breaker has reduced mass and a smaller aerodynamic resistance. The compact circuit breaker and associated connection system of the present invention has all high voltage components which are entirely encapsulated in insulation and enclosed by a screen which can be grounded; this means that there are no exposed high voltage surfaces or external electric fields which permits safe installation within or under the train car structure without need of the large electrical air clearances required of conventional train circuit breakers, and which therefore realizes considerable reduction in size and weight of any enclosing cabinet, case or cover. Also the present invention provides a fully encapsulated system whose electrical insulating properties are not affected by pollution, precipitation or air pressure and which can therefore be operated in extreme conditions with no maintenance required.

What is claimed is:

1. A high voltage circuit breaker, comprising:
a vacuum interrupter module having a vacuum interrupter housing, a pair of electrical contacts disposed in the vacuum interrupter housing, at least one of the pair of electrical contacts is movable relative to the other of the pair of electrical contacts to engage and disengage the electrical contacts from one another for switching a high voltage on and off, a connection block formed of a conductive material, and a sliding contact member attached to the at least one movable electrical contact and slidably disposed within the connection block;
a drive module disposed in part within the vacuum interrupter module having a drive module housing with a housing body and a first end fitting and a second end fitting opposite the first, the housing body electrically insulating the first end fitting from the second end fitting and a drive member having a first end part, a second end part opposite the first, and a central part, the central part electrically insulating the first end part from the second end part, the drive member coupled with the at least one movable electrical contact by attachment of the drive member to the sliding contact member, the central part of the drive member disposed in the drive module housing and insulated from an ambient air, an end of the drive module housing is removably attachable to an end of the connection block; and
an actuator coupled to the drive member and moving the pair of electrical contacts relative to one another.

2. The high voltage circuit breaker of claim 1, wherein the drive member is a rod formed from an electrically insulating material.

3. The high voltage circuit breaker of claim 1, wherein the drive module housing is filled with a dielectric material, the central part of the drive member immersed in the dielectric material.

4. The high voltage circuit breaker of claim 1, wherein the drive module housing contains a vacuum, the central part of the drive member surrounded by the vacuum.

5. The high voltage circuit breaker of claim 4, wherein the vacuum within the drive module housing is separate from a vacuum within the vacuum interrupter housing.

6. The high voltage circuit breaker of claim 1, wherein the drive module and the vacuum interrupter module are physically separable.

7. The high voltage circuit breaker of claim 1, further comprising an encapsulation covering the vacuum interrupter module and the drive module.

8. The high voltage circuit breaker of claim 7, wherein the encapsulation has an insulating layer, a conductive layer, and a plurality of apertures permitting electrical connection to the pair of electrical contacts from an exterior.

9. The high voltage circuit breaker of claim 7, wherein the encapsulation has an opening receiving the drive module.

10. A high voltage circuit breaker system, comprising:
a high voltage circuit breaker including
a vacuum interrupter module having a vacuum interrupter housing, a pair of electrical contacts disposed in the vacuum interrupter housing, at least one of the pair of electrical contacts is movable relative to the other of the pair of electrical contacts to engage and disengage the electrical contacts from one another for switching a high voltage on and off, a connection block formed of a conductive material, and a sliding contact member attached to at least one movable electrical contact and slidably disposed within the connection block,
a drive module disposed in part within the vacuum interrupter module having a drive module housing with a housing body and a first end fitting and a second end fitting opposite the first, the housing body electrically insulating the first end fitting from the second end fitting and a drive member having a first end part, a second end part opposite the first, and a central part, the central part electrically insulating the first end part from the second end part, the drive member coupled with the at least one movable electrical contact by attachment of the drive member to the sliding contact member, the central part of the drive member disposed in the drive module housing and insulated from an ambient air, an end of the drive module housing is removably attachable to an end of the connection block, and
an actuator coupled to the drive member and moving the pair of electrical contacts relative to one another; and
a control unit instructing the actuator to engage or disengage the pair of electrical contacts.

11. The high voltage circuit breaker system of claim 10, wherein the high voltage circuit breaker is disposed under a roof of a train car.

12. The high voltage circuit breaker system of claim 10, wherein the control unit is disposed under a roof of a train car.

13. The high voltage circuit breaker system of claim 10, wherein the high voltage circuit breaker is connected to a pantograph of a train car by at least one of a cable termination bushing, a roof bushing, and a grounding switch.

14. The high voltage circuit breaker system of claim 10, wherein the high voltage circuit breaker is disposed horizontally on a roof of a train car.

15. The high voltage circuit breaker system of claim 14, wherein the high voltage circuit breaker is disposed under an aerodynamic cover on the roof of the train car.

16. The high voltage circuit breaker system of claim 10, further comprising a current probe measuring a current through any of the pair of electrical contacts and a voltage probe measuring a voltage bias between the pair of electrical contacts.

17. The high voltage circuit breaker system of claim 16, wherein the control unit processes measurements from the current probe and voltage probe to detect a loss of a vacuum in the vacuum interrupter housing or a tripping condition.

18. The high voltage circuit breaker system of claim 10, further comprising at least one of a grounding switch, a surge arrester, a current transducer, and a termination bushing assembly.

19. A vacuum interrupter module for a high voltage circuit breaker, comprising:
a vacuum interrupter housing;
a pair of electrical contacts disposed in the vacuum interrupter housing, at least one of the pair of electrical contacts is movable relative to the other of the pair of electrical contacts to engage and disengage the electrical contacts from one another for switching a high voltage on and off;
an encapsulation having an opening receiving in part a drive module the drive module having a drive module housing with a housing body and a first end fitting and a second end fitting opposite the first, and a conductive layer, the housing body electrically insulating the first end fitting from the second end fitting and a drive member having a first end part, a second end part opposite the first, and a central part, the central part disposed in the drive module housing and surrounded by a vacuum electrically insulating the first end part from the second end part, the encapsulation further having an insulating layer, a conductive layer, and a plurality of apertures permitting electrical connection to the pair of electrical contacts from an exterior of the vacuum interrupter module;
a connection block formed of a conductive material disposed exterior of the vacuum interrupter housing and within the encapsulation; and
a sliding contact member attached to the at least one movable electrical contact and slidably disposed within the connection block.

20. The vacuum interrupter module of claim 19, wherein the drive module has the drive member coupled with the at least one movable electrical contact.

21. A drive module for a high voltage circuit breaker, comprising:
a drive module housing; and
a drive member having a first end part, a second end part opposite the first, and a central part, the central part electrically insulating the first end part from the second end part, the drive member coupled with an actuator and at least one movable electrical contact of a vacuum interrupter module, the central part of the drive member formed entirely of an electrically insulating material is disposed in the drive module housing and surrounded by a vacuum insulated from an ambient air.

* * * * *